United States Patent
Suzuki

(10) Patent No.: US 6,943,944 B2
(45) Date of Patent: Sep. 13, 2005

(54) LASER MICROSCOPE AND LASER PULSE WIDTH CONTROL METHOD

(75) Inventor: Motohiko Suzuki, Kawasaki (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/744,433

(22) Filed: Dec. 22, 2003

(65) Prior Publication Data

US 2004/0136060 A1 Jul. 15, 2004

Related U.S. Application Data

(62) Division of application No. 09/966,922, filed on Sep. 28, 2001, now Pat. No. 6,697,196.

(30) Foreign Application Priority Data

Sep. 29, 2000 (JP) ........................................ 2000-301443

(51) Int. Cl.[7] .............................................. G02B 21/06
(52) U.S. Cl. ........................ 359/385; 359/368; 359/388
(58) Field of Search ................................. 359/368–390; 250/458.1, 483.1, 459.1; 385/22–30

(56) References Cited

U.S. PATENT DOCUMENTS

| | | | |
|---|---|---|---|
| 4,241,251 A | * 12/1980 | Yonekubo | 250/205 |
| 4,512,660 A | 4/1985 | Goldberg | 356/301 |
| 4,555,620 A | * 11/1985 | Bridson et al. | 250/205 |
| 4,643,540 A | * 2/1987 | Kawasaki et al. | 359/368 |
| 5,034,613 A | 7/1991 | Denk et al. | 250/458.1 |
| 5,133,602 A | 7/1992 | Batchelder et al. | 356/375 |
| 5,252,834 A | 10/1993 | Lin | 250/458.1 |
| 5,289,114 A | 2/1994 | Nakamura et al. | 324/96 |
| 5,583,342 A | 12/1996 | Ichie | 250/459.1 |
| 5,862,287 A | 1/1999 | Stock et al. | 385/123 |
| 5,995,281 A | 11/1999 | Simon et al. | 359/368 |
| 6,134,010 A | 10/2000 | Zavislan | 356/364 |
| 6,169,289 B1 | 1/2001 | White et al. | 250/458.1 |
| 6,178,041 B1 | 1/2001 | Simon | 359/368 |
| 6,521,899 B1 | 2/2003 | Wolleschensky | 250/458.1 |

FOREIGN PATENT DOCUMENTS

| | | |
|---|---|---|
| JP | 5-503149 A | 5/1993 |
| JP | 10-318924 | 12/1998 |
| JP | 11-326775 | 11/1999 |

OTHER PUBLICATIONS

G. J. Brakenhoff et al: "Femtosecond Pulse Width Control in Microscopy by Two–Photon Absorption Autocorrelation"; Sep., 1995; pp. 253–260; Journal of Microscopy, vol. 179, Pt. 3.

U.S. Appl. No. 09/265,183 entitled Laser Microscope, filed Mar. 9, 1999, Inventor: Masaharu Tomioka.

* cited by examiner

Primary Examiner—Thong Q Nguyen
(74) Attorney, Agent, or Firm—Frishauf, Holtz, Goodman & Chick, P.C.

(57) ABSTRACT

A laser microscope according to the present invention is characterized by comprising a laser light source configured to emit an ultra-short pulse laser beam, a storage unit configured to store at least one of dispersion data and chirp amounts of a plurality of optical members inserted in an optical path, a pulse width adjuster configured to adjust a pulse width of the ultra-short pulse laser beam, and a controller configured to control the pulse width adjuster based on at least one of the dispersion data and the chirp amounts of at least one of a laser wavelength of the laser light source and at least one optical member so that the pulse width is shortened on a sample surface.

3 Claims, 6 Drawing Sheets

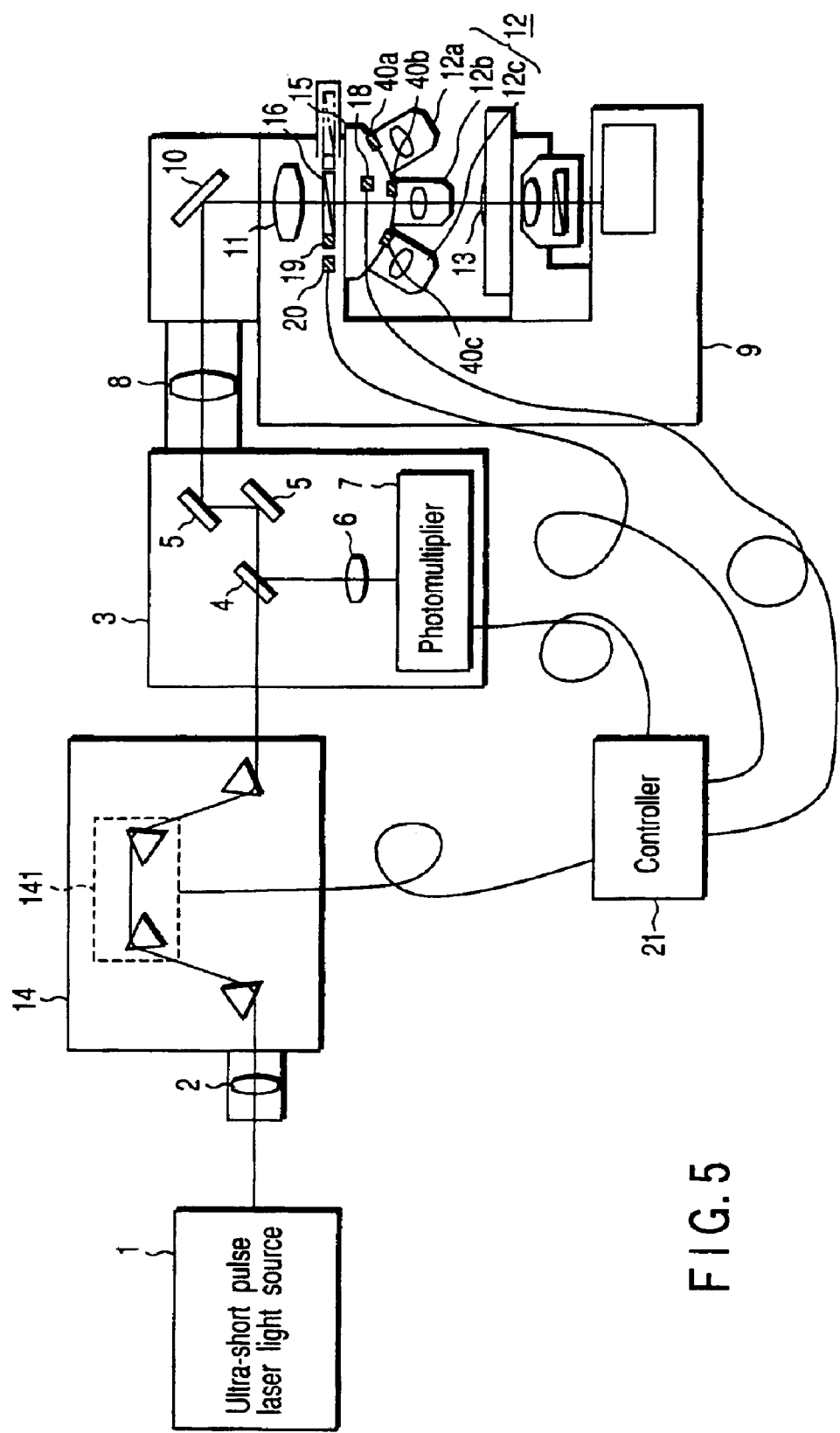
F I G. 5

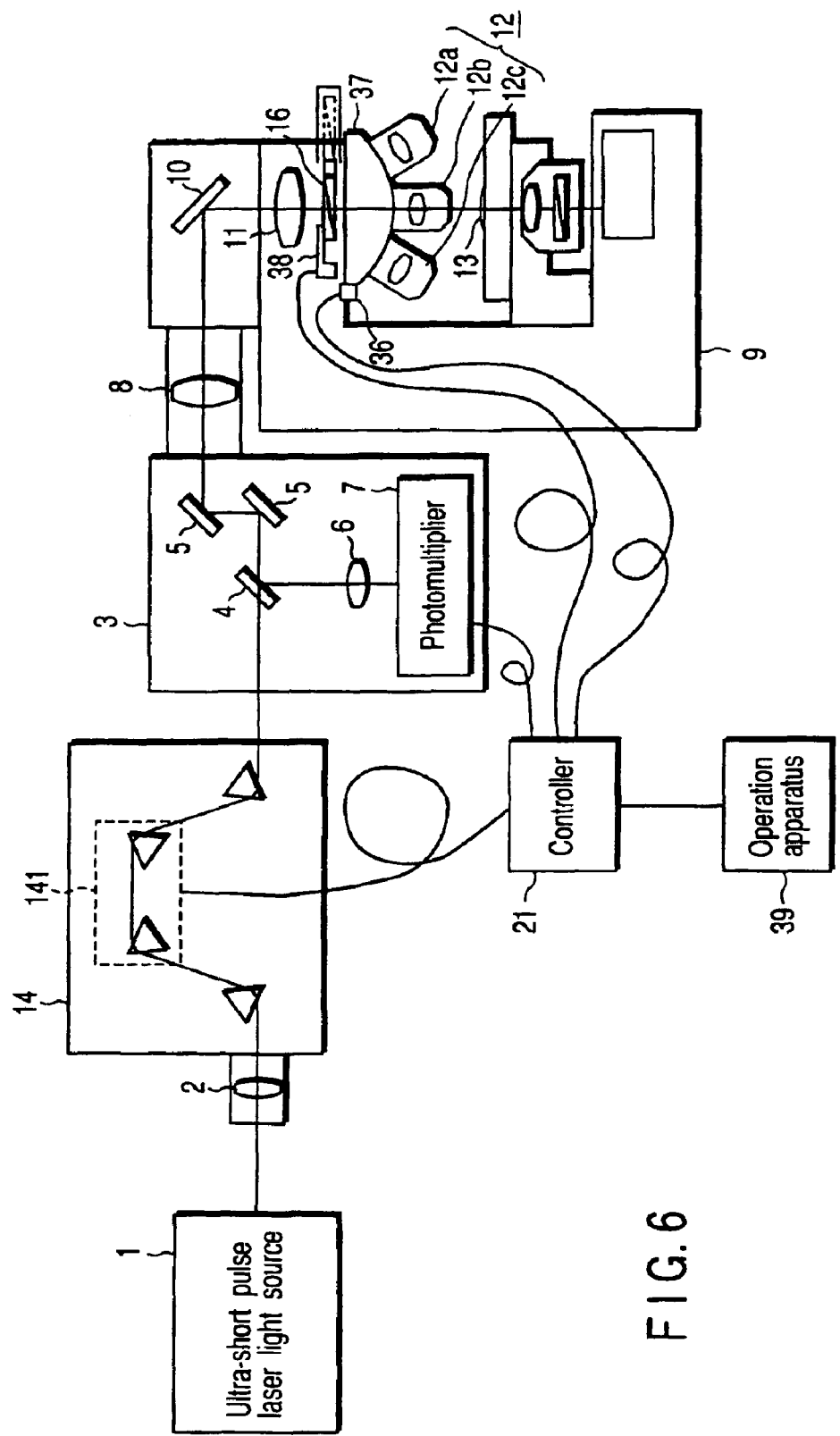
F I G. 6

LASER MICROSCOPE AND LASER PULSE WIDTH CONTROL METHOD

This is a Division of U.S. patent application Ser. No. 09/966,922 filed Sep. 28, 2001 now U.S. Pat. No. 6,697,196.

CROSS-REFERENCE TO RELATED APPLICATION

This application is based upon and claims the benefit of priority from the prior Japanese Patent Application No. 2000-301443, filed Sep. 29, 2000, the entire contents of which are incorporated herein by reference.

BACKGROUND OF THE INVENTION

1. Field of the Invention

The present invention relates to a scanning multi-photon excitation laser microscope which detects chemical reaction or fluorescence by multi-photon absorption of a sample and a laser pulse width control method for minimizing a pulse width of a laser beam on a sample surface.

2. Description of the Background Art

A multi-photon exciting scanning type laser microscope has heretofore been known as a laser microscope, in which a sample as an observation object is irradiated with an ultra-short pulse laser beam, and which detects chemical reaction or fluorescence by multi-photon absorption of the sample.

A multi-photon excitation phenomenon occurs at a probability which is proportional to n-power (n=2 for 2-photon excitation, n=3 for 3-photon excitation) of a photon density per unit area and unit time. Therefore, a laser beam of an ultra-short pulse usually of a sub picosecond order is used in a light source for a multi-photon excitation method.

However, the laser beam of the sub picosecond pulse does not have a completely single wavelength, and has a wavelength width having correlation with a pulse width. In general, when light passes through an optical system, a speed thereof in a medium is low with a shorter wavelength, and high with a longer wavelength. Therefore, when the pulse laser beam has the wavelength width as described above, a difference is generated in a transmission time in accordance with the wavelength during transmission through the optical system. As a result, so-called chirp occurs in which the pulse width after the transmission through the optical system is expanded as compared with the pulse width before incidence upon the optical system.

The multi-photon excitation phenomenon depends on a photon density. Therefore, expansion of the pulse width on a sample surface caused by the chirp deteriorates the probability at which the multi-photon excitation phenomenon occurs. As a result, obtained fluorescence is darkened.

It is known that pulse width adjuster, that is,. so-called pre-chirp compensation is used as means for solving the problem. The pre-chirp compensation is an optical system configured by a prism pair, a grating pair, or a combination of these pairs. In the pre-chirp compensation, when a long wavelength light of pulse laser is incident behind a short wavelength light, the expansion of the pulse width after the transmission through the optical system is corrected.

On the other hand, a case in which the multi-photon excitation method is used in the scanning laser microscope. The scanning laser microscope usually includes one selected from a plurality of objective lenses and other optical systems (such as prism and mirror). These plurality of objective lenses and other optical systems differ from one another in optical path length and material. Therefore, the expansion of the pulse width differs with the selected optical system such as the objective lens. In order to perform the multi-photon excitation method on an optimum condition, it is necessary to adjust the pre-chirp compensation, every time the optical system such as the objective lens is selected.

The expansion of the pulse width also depends on the pulse width of the pulse laser beam. Therefore, when the wavelength of the pulse laser beam is variable, the pre-chirp compensation needs to be similarly adjusted for every change of the wavelength.

Methods disclosed in Jpn. Pat. Appln. KOKAI Publication No. 10-318924 and the Related U.S. patent application Ser. No. 09/265183 have heretofore been known as a method for optimizing the adjustment of the pre-chirp compensation.

Among these, the Jpn. Pat. Appln. KOKAI Publication No. 10-318924 discloses a method of: disposing an apparatus comprising a collimating optical system disposed opposite to the objective lens via the sample and an autocorrelator for measuring the pulse width; and adjusting the pre-chirp compensation while the pulse width on the sample is measured.

Additionally, in the method, since the collimating optical system and autocorrelator are disposed in the vicinity of the sample, the apparatus is enlarged in size. Therefore, for example, patch clamping is performed by inserting an electrode into the sample during observation. In this case, a problem occurs that it is difficult to secure an operation space around the sample.

Moreover, the Related U.S. patent application Ser. No. 09/265183 discloses a method of disposing a correction optical member in accordance with the optical path length of each objective lens, and selecting and disposing the correction optical member in the optical path in accordance with the selected objective lens.

In the method, when there are other selected optical systems such as the prism and mirror in addition to the objective lenses, the correction optical members are necessary for the optical systems, and the apparatus therefore increases in size. Moreover, it is also difficult to prepare a large number of correction optical members for all the optical systems. Furthermore, the correction optical members are only changed, and fine adjustment cannot be performed. Therefore, when the laser beam with a variable wavelength is used, it is also difficult to optimize/adjust the pre-chirp compensation in all wavelength areas.

BRIEF SUMMARY OF THE INVENTION

An object of the present invention is to provide a laser microscope in which an optimum pulse width adjustment can be performed in order to reduce or preferably minimize a pulse width of a laser beam on a sample position.

A laser microscope according to the present invention is characterized by comprising: a laser-light source configured to emit an ultra-short pulse laser beam; a storage unit configured to store at least one of dispersion data and chirp amounts of a plurality of optical members inserted in an optical path; a pulse width adjuster configured to adjust a pulse width of the ultra-short pulse laser beam; and a controller configured to control the pulse width adjuster based on at least one of the dispersion data and the chirp amounts of at least one of a laser wavelength of the laser light source and at least one optical member so that the pulse width is shortened on a sample surface.

Another laser microscope according to the present invention is characterized by comprising: a laser light source configured to emit an ultra-short pulse laser beam; a pulse width adjuster to adjust a pulse width of the ultra-short pulse laser beam; an optical member, attachably/detachably disposed with respect to an optical path, configured to lead the laser beam to a sample; an optical member detector configured to detect attachment/detachment of the optical member with respect to the optical path; a light amount detector configured to detect a light emitted from the sample; and a controller configured to control the pulse width adjuster so as to increase a light amount detected by the light amount detector, when the optical member detector detects the attachment/detachment of the optical member with respect to the optical path.

A laser pulse width control method according to the present invention is characterized by comprising: storing at least one of dispersion data and chirp amounts of a plurality of optical members inserted in an optical path; and controlling pulse width adjuster so that the pulse width is shortened on a sample surface based on at least one of the dispersion data and the chirp amounts of at least one optical member corresponding to at least one of a laser wavelength of a laser light source.

As a result, according to the present invention, even when a wavelength of ultra-short pulse laser is changed and an optical member such as an objective lens is attached/detached and changed with respect to an optical path, chirp compensation is appropriately adjusted. Adjustment of the pulse width of the ultra-short pulse laser is always controlled so that the laser pulse width on a sample surface is minimized. Therefore, the sample can be observed on an optimum condition.

BRIEF DESCRIPTION OF THE SEVERAL VIEWS OF THE DRAWING

FIG. 5 shows a schematic configuration of a laser according to the fifth embodiment of the present invention; and FIG. 6 shows a schematic configuration of a laser according to the sixth embodiment of the present invention.

DETAILED DESCRIPTION OF THE INVENTION

Embodiments of the present invention will be described hereinafter with reference to the drawings.

Figure 1:
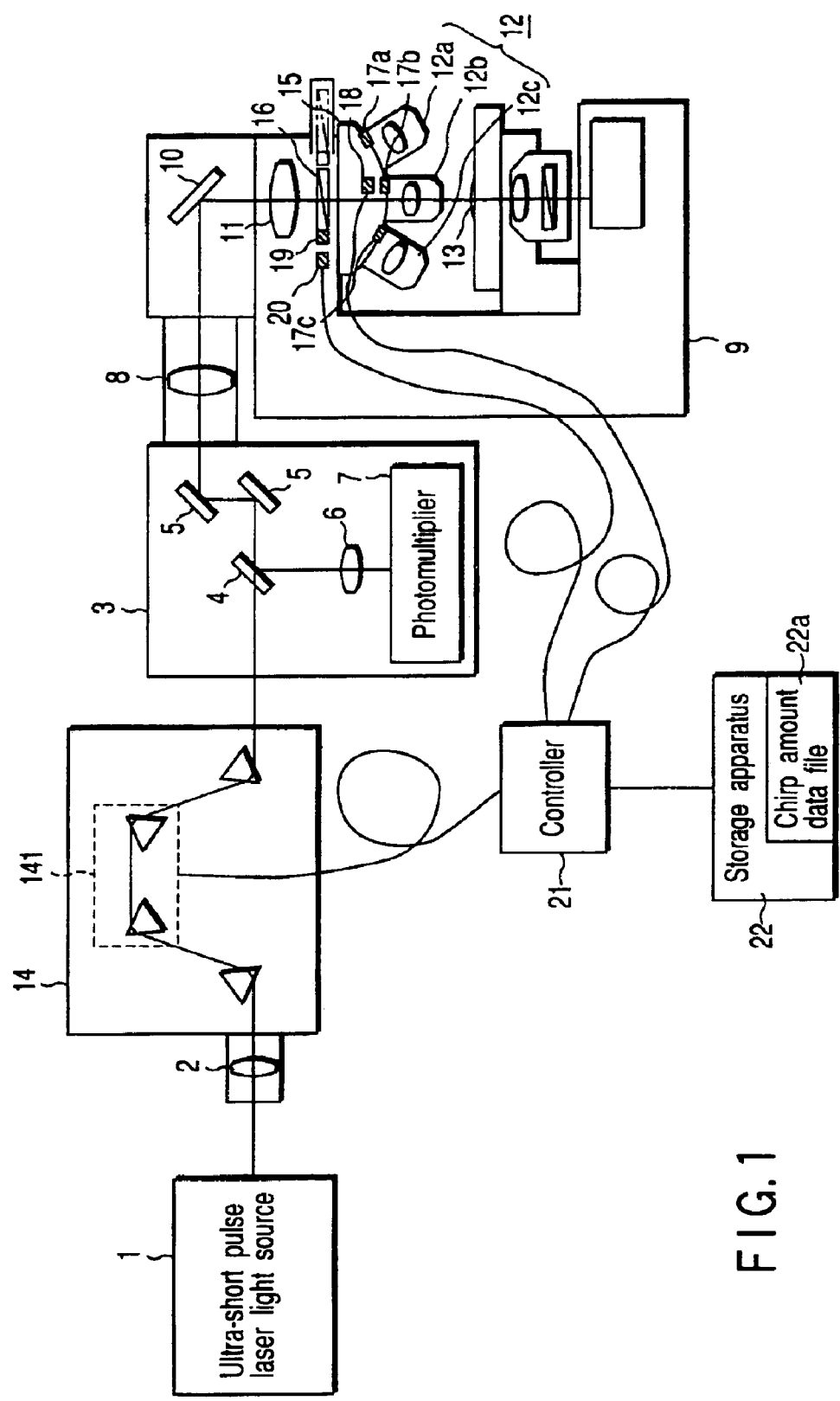
FIG. 1 shows a schematic configuration of a laser according to the first embodiment of the present invention.

FIG. 1 shows a schematic configuration of a scanning multi-photon excitation laser microscope to which the present invention is applied. In FIG. 1, an ultra-short pulse laser beam emitted from an ultra-short pulse laser light source 1 which generates the ultra-short pulse laser beam is shaped into a parallel beam by a collimating lens 2, incident upon a scanner unit 3 via a pre-chirp compensation adjustment apparatus 14 described later, two-dimensionally deflected by a galvano-mirror 5 and incident upon a microscope main body 9 through a projection lens 8. The laser beam incident upon the microscope main body 9 is deflected along a microscope light axis by a deflection member 10, and transmitted through a tube lens 11 and objective lens 12 to form an image on a sample 13.

In the sample 13 a multi-photon excitation phenomenon occurs in a focus of the objective lens 12 and fluorescence is emitted. The fluorescence is again taken into the objective lens 12, and passed through the tube lens 11 and projection lens 8. Thereafter, the fluorescence is returned to a fixed beam by the galvano-mirror 5, and separated from the laser beam by a dichroic mirror 4. Subsequently, the fluorescence is projected into a photomultiplier 7 as a light receiving element by a projection lens 6, received, processed by a computer (not shown), and constructed as the image.

The objective lens 12 of the microscope main body 9 includes a plurality of objective lenses 12a to 12c which are different from one another in magnification. The objective lenses 12a to 12c are disposed in a revolver 15 and can selectively be changed on an optical path. Moreover, a differential interference prism 16 is attachably/detachably disposed in the optical path between the tube lens 11 and the objective lens 12.

Respective flags 17a to 17c are disposed on the objective lenses 12a to 12c. The revolver 15 includes a sensor 18 which detects the flags 17a to 17c to recognize the objective lenses 12a to 12c positioned in the optical path. Moreover, a flag 19 is also disposed in the differential interference prism 16. The microscope main body 9 includes a sensor 20 which detects the flag 19 to recognize the differential interference prism 16 positioned in the optical path.

Furthermore, the sensors 18 and 20 are connected to a controller 21. The controller 21 is connected to a storage apparatus 22 and the pre-chirp compensation adjustment apparatus 14.

The storage apparatus 22 stores respective chirp amounts of the objective lenses 12a to 12c and differential interference prism 16 with respect to the wavelength of the pulse laser beam of the ultra-short pulse laser light source 1, for example, as a chirp amount data file 22a.

The controller 21 recognizes types of the objective lenses 12a to 12c in the optical path and judges whether or not the differential interference prism 16 exists from detection outputs of the sensors 18 and 20. Moreover, the controller 21 reads the chirp amounts of the corresponding objective lenses 12a to 12c and differential interference prism 16 from the chirp amount data file 22a of the storage apparatus 22 based on a recognition result. Furthermore, the controller 21 obtains the chirp amount to be corrected, obtains driving amount of the driving device 141 of the pre-chirp compensation adjustment apparatus 14 for the chirp amount to be corrected, and outputs the amount to the pre-chirp compensation adjustment apparatus 14.

The pre-chirp compensation adjustment apparatus 14 is configured of a prism pair, a grating pair, or a combination of these pairs as a known technique. In the present invention, when the pre-chirp compensation adjustment apparatus 14 is driven by a driving device 141, the chirp amount can be adjusted. In the present invention, the chirp amounts of fixed optical members positioned beforehand on the optical path, such as the dichroic mirror 4, projection lens 8 and tube lens 11 are set as initial adjustment amounts. Moreover, the driving device 141 adjusts the pre-chirp compensation by the chirp amount to be corrected which is given to the initial adjustment amount by the controller 21. An expansion of a pulse width of the ultra-short pulse laser beam is thus adjusted.

In the aforementioned configuration, when the ultra-short pulse laser light source 1 emits the ultra-short pulse laser beam, the laser beam is passed through the objective lens 12 and focused on the sample 13 similarly as described above.

The laser beam causes multi-photon excitation phenomenon in the focus of the objective lens 12 and fluorescence is emitted. The fluorescence is again taken into the objective lens 12, and received by the photomultiplier 7 via the dichroic mirror 4 and projection lens 6. The sample 13 is observed from the image constructed by the computer.

To change an observation condition from this state, the revolver 15 changes the objective lenses 12a to 12c positioned on the optical path, the objective lens 12b is positioned on the optical path as shown in FIG. 1, and the differential interference prism 16 is additionally inserted into the optical path. The objective lens 12b is recognized by the sensor 18, the differential interference prism 16 is recognized by the sensor 20, and these detection outputs are sent to the controller 21.

The controller 21 recognizes the objective lens 12b and differential interference prism 16 from the detection outputs of the sensors 18 and 20, and reads the chirp amounts of the corresponding objective lens 12b and differential interference prism 16 from the chirp amount data file 22a of the storage apparatus 22. Furthermore, the controller 21 obtains the chirp amount to be corrected, and outputs correction information to the pre-chirp compensation adjustment apparatus 14.

The pre-chirp compensation adjustment apparatus 14 adjusts the pre-chirp compensation via the driving device 141 by the chirp amount to be corrected with respect to the predetermined initial adjustment amount. Thereby, the expansion of the pulse width of the ultra-short pulse laser beam is adjusted, so that the pulse width of the pulse laser beam on the sample 13 is reduced or preferably minimized.

Therefore, in this case, when the objective lenses 12a to 12c are selectively changed on the optical path, and the differential interference prism 16 is attached/detached with respect to the optical path, changes of the chirp amounts are automatically corrected, and the chirp compensation is appropriately adjusted. Therefore, since the pulse width of the laser beam on the sample 13 can always be kept to be short or preferably minimum, the sample can be observed on the optimum condition.

Figure 2:
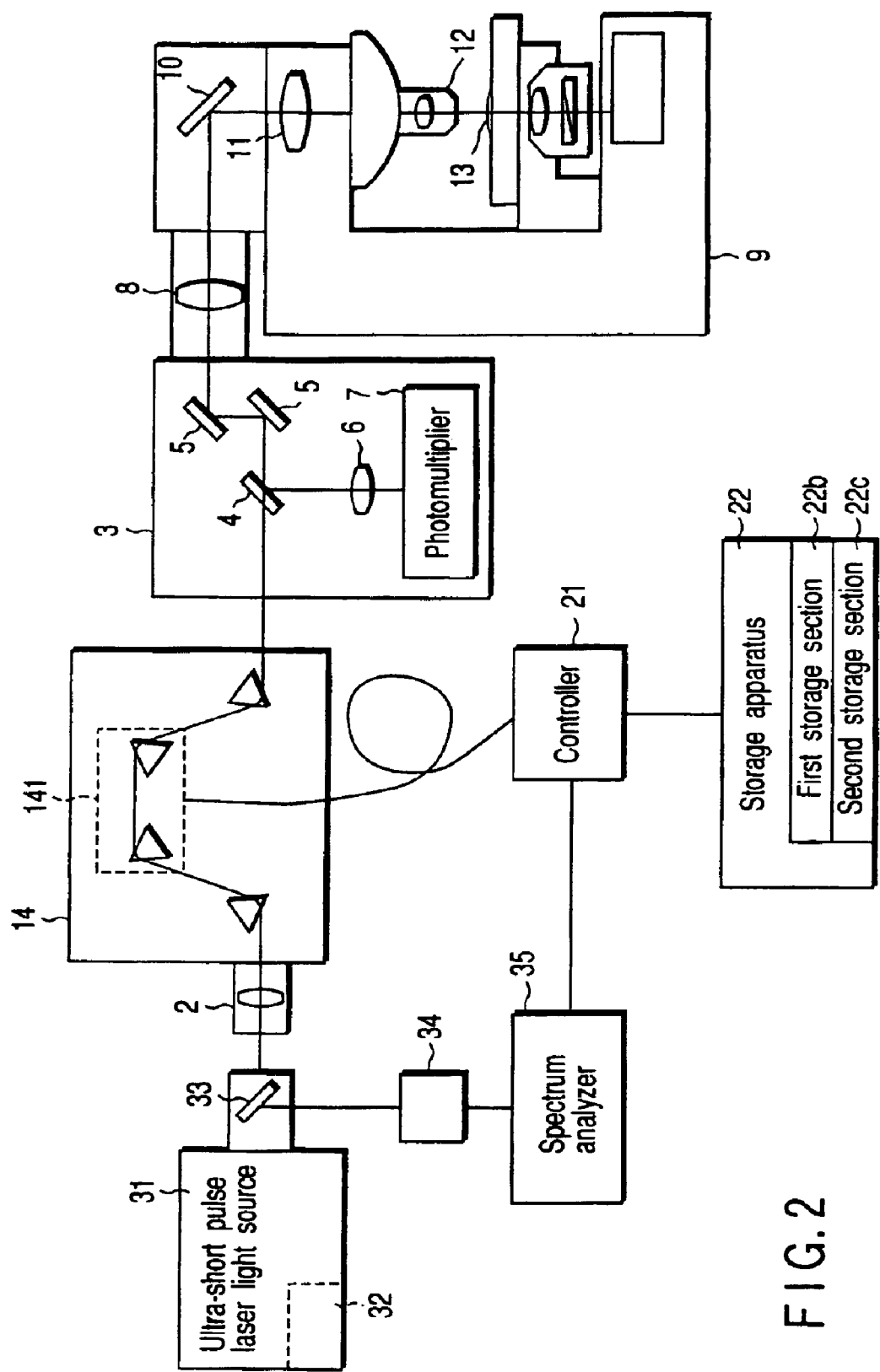
FIG. 2 shows a schematic configuration of a laser according to the second embodiment of the present invention.

FIG. 2 is a figure showing a schematic configuration according to the second embodiment of the present invention. The same part as that of FIG. 1 is denoted with the same reference numerals.

An ultra-short pulse laser light source 31 having a wavelength change mechanism 32 can arbitrarily change the wavelength of the ultra-short pulse laser beam, changes the wavelength in accordance with absorption wavelength of a fluorescent dyestuff for use in observation, and emits the ultra-short pulse laser beam.

A mirror 33 is disposed midway in the optical path of the ultra-short pulse laser beam emitted by the ultra-short pulse laser light source 31. A part of the ultra-short pulse laser beam is branched by the mirror 33, and incident upon a spectrum analyzer 35 as wavelength recognition means via a spectrum analyzer head 34. The spectrum analyzer 35 recognizes the wavelength of the ultra-short pulse laser beam emitted by the ultra-short pulse laser light source 31.

The storage apparatus 22 includes a first storage section 22b and a second storage section 22c. The first storage section 22b stores dispersion data of respective optical members positioned in the optical path, such as dichroic mirror 4, projection lens 8, tube lens 11, and objective lens 12 in the example shown in FIG. 2. The second storage section 22c stores a conversion equation which converts the dispersion data, and the like to the chirp amount.

Furthermore, a laser wavelength, and dispersion data of the optical member inserted in the observation optical system are used as parameters of the conversion equation. Additionally, a chirp correction amount of a pre-chirp compensator is obtained by the conversion equation. The controller 21 obtains the chirp amount by calculation based on the wavelength of the ultra-short pulse laser beam recognized by the spectrum analyzer 35 and the dispersion data of the respective optical members stored in the storage apparatus 22, and outputs a calculation result to the pre-chirp compensation adjustment apparatus 14. The chirp amount of each optical member on the optical path with respect to the wavelength of the ultra-short pulse laser which becomes a reference is preset as the initial adjustment value in the pre-chirp compensation adjustment apparatus 14. The pre-chirp compensation adjustment apparatus 14 obtains a difference between the initial adjustment value and the chirp amount given by the controller 21. Moreover, when the pre-chirp compensation adjustment apparatus 14 adjusts the pre-chirp compensation via the driving device 141 in accordance with the difference, the expansion of the pulse width of the ultra-short pulse laser beam is adjusted.

Even when the wavelength of the ultra-short pulse laser beam of the ultra-short pulse laser light source 31 is changed, the change of the chirp amount is automatically corrected, and the chirp compensation is appropriately adjusted. Therefore, since the pulse width of laser on the sample 13 can always be kept to be short or preferably minimum, the sample can be observed on the optimum condition.

Figure 3:
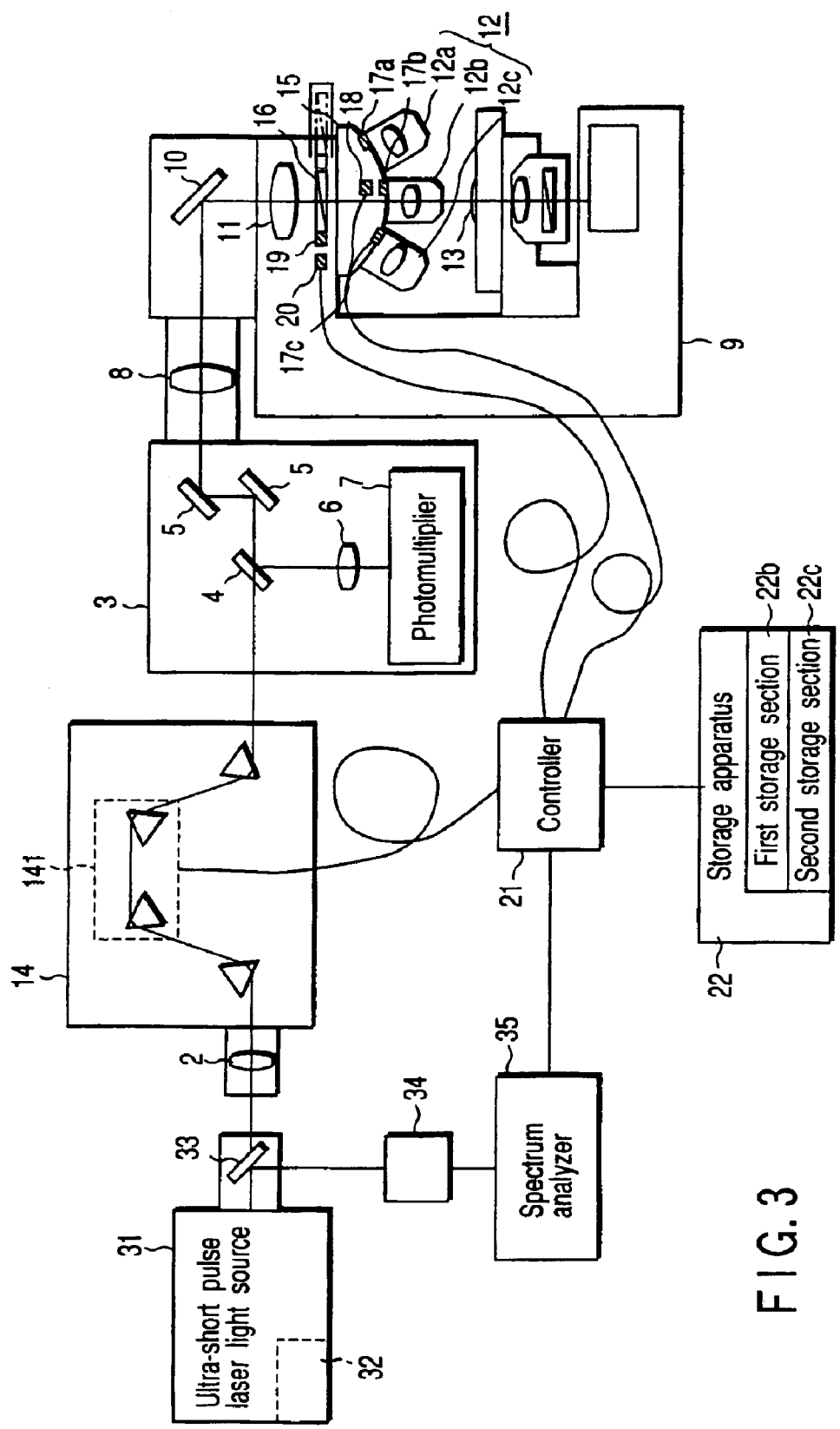
FIG. 3 shows a schematic configuration of a laser according to the third embodiment of the present invention.

FIG. 3 is a figure showing a schematic configuration according to the third embodiment of the present invention. The same part as that of FIGS. 1 and 2 is denoted with the same reference numerals.

In the third embodiment, similarly as the first embodiment, the plurality of objective lenses 12a to 12c are changeably disposed in the revolver 15, and the differential interference prism 16 is attachably/detachably disposed with respect to the optical path. Furthermore, the respective flags 17a to 17c are disposed in the objective lenses 12a to 12c, and the sensor 18 which detects the flags 17a to 17c is disposed in the revolver 15, so that the changeover of the respective objective lenses 12a to 12c can be detected. Moreover, the flag 19 is disposed in the differential interference prism 16, and the sensor 20 which detects the flag 19 is disposed in the microscope main body 9, so that attachment/detachment of the differential interference prism 16 with respect to the optical path can be detected.

On the other hand, similarly as the second embodiment, the wavelength of the ultra-short pulse laser light source 31 can be changed by the wavelength change mechanism 32, a part of the pulse laser beam having the changed wavelength is incident upon the spectrum analyzer head 34 via the mirror 33, and the wavelength is recognized by the spectrum analyzer 35.

Similarly as the second embodiment, the storage apparatus 22 stores the dispersion data of the objective lenses 12a to 12c and differential interference prism 16. The controller 21 obtains the chirp amount by calculation from the wavelength of the ultra-short pulse laser beam recognized by the spectrum analyzer 35 and the dispersion data stored in the storage apparatus 22 in accordance with the objective lenses 12a to 12c and differential interference prism 16 positioned on the optical path, and outputs the chirp amount as correction information to the pre-chirp compensation adjustment apparatus 14. The chirp amount of the fixed optical member on the optical path with respect to the wavelength of the ultra-short pulse laser beam as the reference is preset as the initial adjustment value in the pre-chirp compensation adjustment apparatus 14. The pre-chirp compensation adjustment apparatus 14 adjusts the pre-chirp compensation via the driving device 141 with respect to the initial adjustment value only by the chirp amount to be corrected, and adjusts the expansion of the pulse width of the ultra-short pulse laser beam.

According to the third embodiment, even with the changeover of the objective lenses 12a to 12c with respect to the optical path, attachment/detachment of the differential interference prism 16, and the change of wavelength of the ultra-short pulse laser beam of the ultra-short pulse laser light source 31, the chirp amount is automatically corrected. As a result, the chirp compensation is appropriately adjusted. Therefore, since the pulse width of laser beam on the sample 13 can always be kept to be short or preferably minimum, the sample can be observed on the optimum condition.

Figure 4:
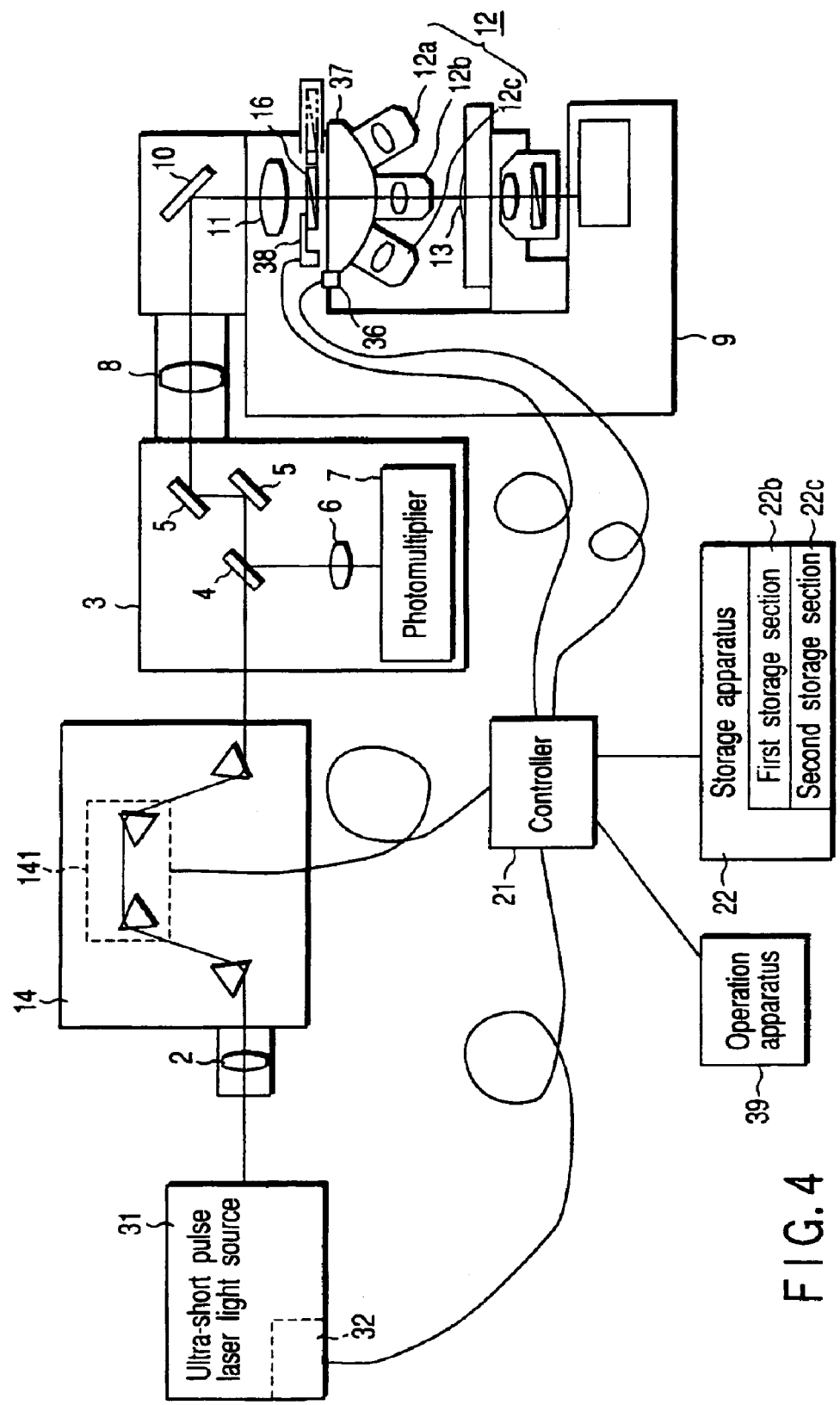
FIG. 4 shows a schematic configuration of a laser according to the fourth embodiment of the present invention.

FIG. 4 is a figure showing a schematic configuration of a fourth embodiment of the present invention. The same part as that of FIG. 3 is denoted with the same reference numerals.

The plurality of objective lenses 12a to 12c are held by an electromotive revolver 37 having a motor 36. Moreover, the differential interference prism 16 is disposed to be attachable/detachable by a motor 38. Furthermore, the ultra-short pulse laser light source 31 has the electromotive wavelength change mechanism 32.

These motors 36, 38 and wavelength change mechanism 32 are connected to the controller 21, and remote control is enabled by an operation device 39 which is input means. The respective motors 36, 38 are driven via the controller 21, and the wavelength change mechanism 32 is controlled in accordance with designated information of the optical member inputted into the operation device 39 and designated information of the laser wavelength.

Similarly as the second embodiment, the storage apparatus 22 stores the dispersion data of the objective lenses 12a to 12c, differential interference prism 16, and the like. The controller 21 obtains the chirp amount by calculation from the dispersion data stored in the storage apparatus 22 in accordance with the wavelength of the ultra-short pulse laser beam and the dispersion data stored in the storage apparatus 22 in accordance with the objective lenses 12a to 12c and differential interference prism 16 based on the designated information of the optical member from the operation device 39 and the designated information of the laser wavelength. Then, the controller 21 outputs a calculated value as the correction information to the pre-chirp compensation adjustment apparatus 14. The chirp amount of the fixed optical member on the optical path with respect to the wavelength of the ultra-short pulse laser beam as the reference is preset as the initial adjustment value in the pre-chirp compensation adjustment apparatus 14. The pre-chirp compensation adjustment apparatus 14 drives the driving device 141 only by the chirp amount to be corrected with respect to the initial adjustment value, adjusts the pre-chirp compensation, and adjusts the expansion of the pulse width of the ultra-short pulse laser beam.

According to the fourth embodiment, the changeover of the objective lenses 12a to 12c with respect to the optical path, attachment/detachment of the differential interference prism 16, and the change of wavelength of the ultra-short pulse laser beam of the ultra-short pulse laser light source 31 can remotely be operated by the external operation device 39. Furthermore, the change of the chirp amount generated by the remote operation is automatically corrected, and the chirp compensation is appropriately adjusted. Therefore, since the pulse width of laser beam on the sample 13 can always be kept to be short or preferably minimum, the sample can be observed on the optimum condition.

FIG. 5 is a figure showing a schematic configuration according to the fifth embodiment of the present invention. The same part as that of FIG. 1 is denoted with the same reference numerals.

The plurality of objective lenses 12a to 12c are changeably disposed in the revolver 15, and the differential interference prism 16 is attachably/detachably disposed with respect to the optical path. Respective flags 40a to 40c are disposed in a position corresponding to an objective lens attachment section in the revolver 15. The sensor 18 which detects the flags 40a to 40c is disposed in the revolver 15, so that a rotating operation of the revolver 15, that is, the changeover of the respective objective lenses 12a to 12c can be detected. Moreover, the flag 19 is disposed in the differential interference prism 16, and the sensor 20 which detects the flag 19 is disposed in the microscope main body 9, so that attachment/detachment of the differential interference prism 16 with respect to the optical path can be detected.

When the sensor 18 detects the changeover of the objective lenses 12a to 12c by the revolver 15, or the sensor 20 detects the attachment/detachment of the differential interference prism 16 with respect to the optical path, the controller 21 stores the operation. Subsequently, when the image is acquired, the controller 21 monitors the output of the photomultiplier 7 while driving the driving device 141 of the pre-chirp compensation adjustment apparatus 14. A position in which the output of the photomultiplier 7 is increased or preferably maximized is searched, and the driving mechanism 141 is stopped in the position. That is, where the output of the photomultiplier 7 increases, the correction of the chirp amount is optimum, and the pulse width on the sample 13 becomes short or preferably minimum.

According to the fifth embodiment, for the changeover of the objective lenses 12a to 12c with respect to the optical path, and the attachment/detachment of the differential interference prism 16, the chirp amount is automatically corrected. Therefore, since the pulse width of laser beam on the sample 13 can always be kept to be short or preferably minimum, the sample can be observed on the optimum condition.

FIG. 6 is a figure showing a schematic configuration of a sixth embodiment of the present invention. The same part as that of FIG. 5 is denoted with the same reference numerals.

The plurality of objective lenses 12a to 12c are held by the electromotive revolver 37 having the motor 36. Moreover, the differential interference prism 16 is also disposed to be attachable/detachable by the motor 38. These motors 36, 38 are connected to the controller 21, and can remotely be controlled by the operation device 39.

When an instruction for changing the objective lenses 12a to 12c by the electromotive revolver 37 or an instruction for attaching/detaching the differential interference prism 16 is inputted into the controller 21 from the operation device 39, the controller 21 stores the instruction. Subsequently, when the operation for acquiring the image is executed, the controller 21 monitors the output of the photomultiplier 7 while driving the driving device 141 of the pre-chirp compensation adjustment apparatus 14. The position in which the output of the photomultiplier 7 is increased or preferably maximized is searched, and the driving mechanism 141 is stopped in the position. That is, where the output of the photomultiplier 7 is increased or preferably maximized, the correction of the chirp amount is optimum, and the pulse width on the sample 13 becomes short or preferably minimum.

According to the sixth embodiment, the changeover of the objective lenses 12a to 12c or the attachment/detachment of the differential interference prism 16 with respect to the optical path can remotely be operated by the external operation device 39. Furthermore, the change of the chirp amount generated by the remote operation is automatically corrected, and the pulse width of laser beam on the sample 13 can always be kept to be short or preferably minimum, so that the sample can be observed on the optimum condition.

Additionally, in the aforementioned embodiments, the objective lens 12 and differential interference prism 16 have been described as the attachable/detachable and changeable optical members, but the present invention is not limited to these, and can also similarly be applied to the other optical members such as the lens, mirror, and prism. Moreover, a technique of pre-chirp compensation is not limited to the prism pair described in the shown embodiments and the present invention is similarly applied to the technique of the grating pair or the combination of these pairs. Furthermore, the ultra-short pulse laser light source 31 whose wavelength is variable is not limited to the source which can continuously vary the wavelength with a single unit. An apparatus for changing and using laser in a system in which a plurality of lasers are controlled by a combiner can also similarly be applied. Moreover, the laser microscope is not limited to the scanning laser fluorescent microscope for observing fluorescence generated by the multi-photon excitation phenomenon. The present invention can similarly be applied also to a laser microscope in which high energy in a pulse peak is utilized to finely process the sample. Furthermore, the present invention is not limited to the aforementioned embodiments, and can variously be changed within the scope of the present invention. For example, the respective embodiments may also be combined with one another.

As described above, according to the present invention, the optimum pulse width adjustment can be performed so as to reduce or preferably minimize the pulse width of the laser beam in the sample position. There can therefore be provided the laser microscope in which the sample can be observed under the optimum condition.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A laser microscope comprising:
    a laser light source configured to emit an ultra-short pulse laser beam;
    a pulse width adjuster to adjust a pulse width of the ultra-short pulse laser beam;
    an optical member, which is attachably and detachably disposed with respect to an optical path, and which is configured to lead the laser beam to a sample;
    an optical member detector configured to detect attachment and detachment of the optical member with respect to the optical path;
    a light amount detector configured to detect an amount of light emitted from said sample due to multi-photon excitation; and
    a controller configured to control said pulse width adjuster based on the detected light amount so as to increase the amount of light detected by said light amount detector, when said optical member detector detects one of the attachment and detachment of the optical member with respect to the optical path;
    wherein when said controller determines that the amount of light detected by said light amount detector is optimized, adjustment of the pulse width by said pulse width adjuster is stopped until said detector again detects one of the attachment and detachment of the optical member with respect to the optical path.

2. The laser microscope according to claim 1, wherein the pulse width adjuster comprises a pre-chirp compensator optical system.

3. A laser pulse width control method comprising:
    emitting an ultra-short pulse laser beam;
    detecting attachment and detachment of an optical member, which is attachably and detachably disposed with respect to an optical path and which leads the laser beam to a sampler with respect to the optical path;
    detecting an amount of light emitted from the sample due to multi-photon excitation; and
    adjusting a pulse width of the ultra-short pulse laser beam based on the detected light amount so as to increase the detected amount of light when one of the attachment and detachment of the optical member with respect to the optical path is detected; and
    determining that the detected light amount is optimized, and then stopping adjustment of the pulse width until one of the attachment and detachment of the optical member with respect to the optical path is again detected.

* * * * *